United States Patent [19]

Kegelman

[11] 4,084,045
[45] Apr. 11, 1978

[54] GALVANIC CELLS EMPLOYING UNCOMPRESSED PARTICLES OF FES AS THE CATHODE

[75] Inventor: Matthew Roland Kegelman, Wilmington, Del.

[73] Assignee: E. I. Du Pont de Nemours & Company, Wilmington, Del.

[21] Appl. No.: 660,854

[22] Filed: Feb. 24, 1976

[51] Int. Cl.² .................................................. H01M 6/14
[52] U.S. Cl. ...................................... 429/194; 429/199
[58] Field of Search ................ 136/25, 100 R, 100 M; 429/194, 196, 197, 199

[56] References Cited

U.S. PATENT DOCUMENTS

| | | | |
|---|---|---|---|
| 2,871,281 | 1/1959 | Moulton | 136/25 |
| 3,507,696 | 4/1970 | Jackovitz et al. | 136/25 |
| 3,947,292 | 3/1976 | Jackovitz et al. | 136/25 |
| 3,953,235 | 4/1976 | Blomgren | 136/25 X |

*Primary Examiner*—Charles F. LeFevour
*Attorney, Agent, or Firm*—James A. Costello

[57] ABSTRACT

High energy density galvanic cells employing as the cathode, loose FeS particles. A sealed cell including a nonaqueous liquid electrolyte with a conductive salt, a lithium anode and FeS particles about 0.04 to 1 m m in diameter.

3 Claims, 3 Drawing Figures

GALVANIC CELLS EMPLOYING UNCOMPRESSED PARTICLES OF FES AS THE CATHODE

BACKGROUND OF THE INVENTION

High energy density galvanic cells can be prepared in a variety of forms including so-called button cells, cylindrical cells and flat ribbon cells. A great variety of organic solvents, electrolyte salts and anodically and cathodically active materials are known to be useful in such cells. Basically, such cells comprise a container, an anode containing anodic material, a cathode containing cathodic material reducible by the anodic material, a conductive electrolyte in contact with both anode and cathode, a non-conductive separator to prevent physical contact between anode and cathode and yet allow passage of electrolyte, and anode and cathode contacts to make an electrical circuit.

To be effective, the material employed as a cathode must either be conductive itself or must incorporate a conductivity aid such as carbon. The art generally employs the cathodically active material in coherent form made, usually, by tightly pressing, sintering or otherwise compacting the material. Very often a binder such as polytetrafluoroethylene is used. Metal screens are sometimes used to hold the active material together and to increase the physical strength of the formed cathode.

Iron sulfide, which is itself conductive, is known as a useful cathodic agent in galvanic cells. For instance, a cell utilizing an iron sulfide cathode is disclosed in U.S. Pat. No. 3,796,604. The cathodes of said patent employ both polytetrafluoroethylene and carbon in addition to the active iron sulfide. It will be appreciated, however, that where diluents such as carbon or binders are used, the resultant cells will suffer a decrease in their maximum energy/unit weight ratio since the amount of active material per unit of cell weight is necessarily lowered by the presence of such diluents.

U.S. Pat. No. 3,639,174 also describes a coherent iron sulfide-containing cathode. U.S. Pat. No. 3,796,606 describes compressed powders (not iron sulfide) as cathodic materials. Highly compressed powders are taught in "High Energy Batteries", Jasinski, Plenum Press, NY 1967, pp. 191 to 197. For low-drain situations, granular copper oxide is known to be useful as a cathodically active material; see "The Primary Battery", Heise et al., John Wiley and Sons, 1971, p. 195.

SUMMARY OF THE INVENTION

In a sealed galvanic cell comprising a container holding a cathode of cathodically active material, an anode, a conductive nonaqueous liquid electrolyte and a separator between the anode and the cathode, the improvement which comprises uncompressed FeS particles as the cathodically active material, said particles being about 0.04 to 1 mm in diameter.

By "uncompressed" is meant that the only pressure on the particles is that minor incidental pressure which results from sealing the cell. No pressure is applied to effect closer particle/particle contact. It is quite surprising that the loose powder cathode described herein is so effective in the invention cells in view of the emphasis placed by the art on the attainment of good conductivity by compressing the cathodic material. There is a definite economic advantage to the elimination of the compression step as effected herein. Depending on the context in which employed, the word "container" includes a top therefor which is insulated from said container. Conductive buttons can be used for both anode and cathode contacts. What is essential is that means be provided for an outside contact from both anode and cathode within the cell.

Size of particulate material is conveniently expressed in terms of sieves employing the standard screen scale. Sieve data can be found on page F-143 of the "Handbook of Chemistry and Physics", 54th edition, 1973–1974, published by Chemical Rubber Publishing Company, Cleveland, Ohio. The size range for iron sulfide particles useful in the present invention includes material that passes through a 16 mesh screen but is retained on a 325 mesh screen. The size range is thus from about 1 mm to 0.044 mm in dimension. Segregation of sizes to narrower limits within the range presented above affects performance of the cells only slightly.

Commercial ferrous sulfide, FeS, can be washed with water and dried in an oven before use but this treatment is not essential. The usual impurities found in ferrous sulfide such as other iron sulfides and iron oxides can be tolerated in the cells of the invention. Satisfactory iron sulfide can also be prepared by mixing iron and sulfur powders in a 1:1 atom ratio and heating at 600° to 650° C for 10 to 30 minutes.

The FeS cathodically active particles disclosed and described herein can be employed in the familiar "C" and "D" cells as well as in "button" cells which are usually from about 0.05 to more than 0.1 inch in thickness. The preferred anodically active material used with the FeS particle is lithium metal. Sodium or other alkali metals are useful under some conditions.

The invention cells can employ any nonaqueous electrolyte which is sufficiently conductive and nonreactive with other cell constituents. The electrolyte should have a conductivity at 25° C of at least $1 \times 10^{-4}$ ohm$^{-1}$cm$^{-1}$. Ordinarily, a solution of 5% to 25% of a nonreactive salt in a suitable anhydrous solvent will provide the required conductivity.

Useful nonaqueous organic solvents include tetrahydrofuran, dimethyl carbonate, propylene carbonate, 1,3-dioxolane, 4-methyl-1,3-dioxolane, 1,2-dimethoxyethane, dimethylformamide, trimethyl carbamate, ethyl-N,N-dimethyl carbamate, the dimethyl ether of diethylene glycol and various mixtures of these. Other ingredients such as stabilizers, for instance, can be employed in the solvents listed above. Typical stabilizers are 3,5-dimethylisoxazole, pyridine and triethylamine.

A large number of electrolyte salts are useful in the cells of the invention. Such salts must have sufficient solubility and dissociation to provide conductivity of at least about $1 \times 10^{-4}$ohm$^{-1}$cm$^{-1}$ in the electrolyte solution. Generally, the more useful salts are those with cations chosen from groups IA and IIA of the periodic table. The most useful salts are those wherein lithium, sodium or potassium are the cations. In addition to simple halogen salts many complex salts are useful, including tetrafluoroborates, hexafluorophosphates, hexafluoroarsenates, tetrachloroaluminates, and perchlorates. Also useful are salts of trichloroacetic acid, trifluoroacetic acid and trifluoromethanesulfonic acid. The most preferred salt is LiClO$_4$.

DETAILS OF THE INVENTION

Figure 1:
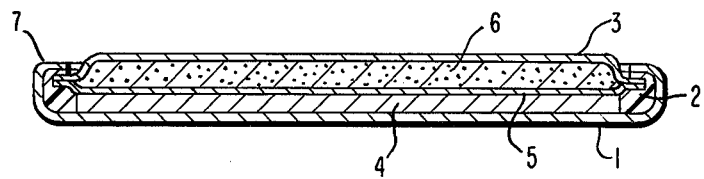
FIG. 1 is a cross-sectional view of a typical button-cell comprised of container 1, L-shaped gasket 2, cover 3, lithium anode 4, separator 5, FeS cathode particles 6, and crimped cup-edge 7.

A typical button cell of FIG. 1 is constructed according to the following procedure. The cell container 1 is constructed by stamping from a 0.015 inch thick stainless steel plate a container having sides extending about 0.115 inch above its base. The container can be round or rectangular in shape and should be etched, say, in mixed HCl—HNO$_3$ as described in more detail in coassigned U.S. Pat. No. 3,756,789.

The nonconductive plastic gasket 2 is a continuous, formed band of polypropylene. The gasket is the same shape in outline as the container and fits snugly inside it. The gasket has an offset at about 0.05 inch from the bottom of the container so that a shoulder exists at that point. The gasket thickness below the shoulder is about 0.05 inch and the thickness of the remainder of the gasket, above the shoulder and to its top edge, level with the top edge of the container, is about 0.02 inch.

The cover 3 is stamped from stainless steel of the same type used for forming the container. The edge of the cover, under 1/16 inch wide around its perimeter, is depressed by about 1/32 inch from its central portion. The cover fits snugly inside the gasket in the container, the cover's edge resting on the lower, offset shoulder portion of the gasket.

The assembly of the battery involving active metal nonaqueous electrolyte systems is best performed in a dry atmosphere, as in a dry box. The shaped and fitted nonconductive gasket is placed within the container. Then, a flat piece of lithium metal 4, shaped to fit closely inside the gasket, is placed in position on the previously etched surface. The lithium anode is pressed tightly into the container so that a conductive bond is made between it and the bottom of the container. A nonconductive separator 5 of the same shape and slightly larger circumference is then placed over the lithium. The separator can be made of paper, plastic or any coherent, liquid-permeable, nonconductive material. The separator has the same circumference as the lid and must be large enough to effectively cover the lithium and preserve it from contact with the cathode material.

Meanwhile, the cover 3 is inverted and is filled to overflowing with particulate FeS 6. A straight edge is drawn across the surface of the particulate material to level it with the edge of the cover. The container, with lithium and separator in it is then inverted, placed over the cover, and the edge of the cover is seated firmly within the gasket periphery. The unsealed cell is then re-inverted. The cover 3 is in contact with the iron sulfide cathode material and provides a conductive cathode contact. The bottom of the container 1 is bonded to the lithium anode and provides a conductive anode contact.

Electrolyte is added by first placing the container which has been constructed as explained above into a receptacle therefor, evacuating the receptacle and finally flooding the receptacle and container with electrolyte.

The assembly is then placed (still inside the dry box) on a fixed base and a plate is lowered under mild pressure to cover the top except for the small circumferential ledge which rests on the gasket shoulder. A die is then pressed over the upstanding edges of the container, exerting radial pressure around the entire perimeter of the container to produce a tight seal between the inner edge of the gasket and the outer edge of the cover and between the outer edge of the gasket and the inner wall of the container. As the die reaches its final position these upstanding edges are bent inwardly 7, at an angle of about 60° to 90° to hold gasket and cover in place. For type 304 stainless steel, 0.015–0.016 inch thick, from which containers and covers can be constructed, a force of about 1000 lbs per lineal inch of sealed edge is required to satisfactorily deform and seal and circular cells. Additional force is needed to deform and seal the corners of rectangular cells. Cells made in this manner are effectively sealed, and show practically no weight loss over a period of six months or more under normal atmospheric conditions.

Figure 2:
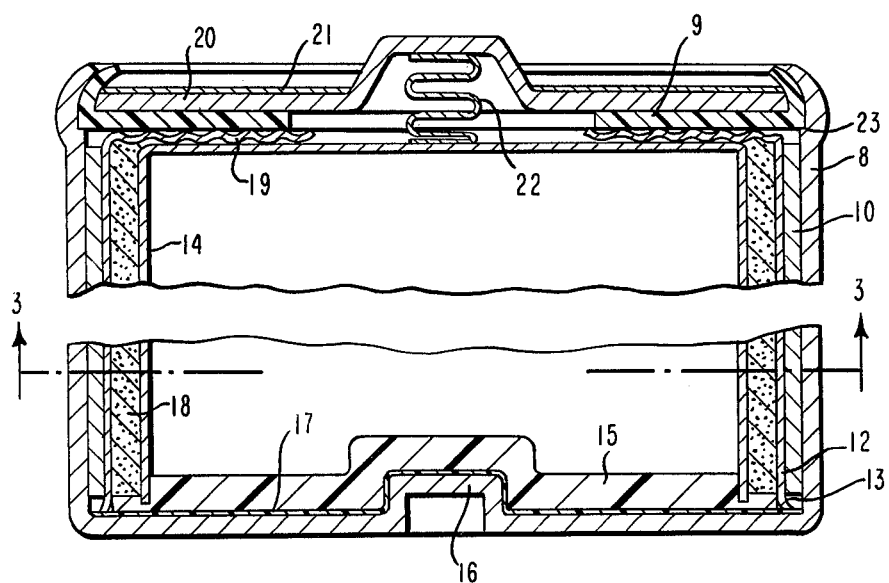
FIG. 2 is a cross-sectional view of a typical cylindrical cell representative of standard "D" and "C" cells.
Figure 3:
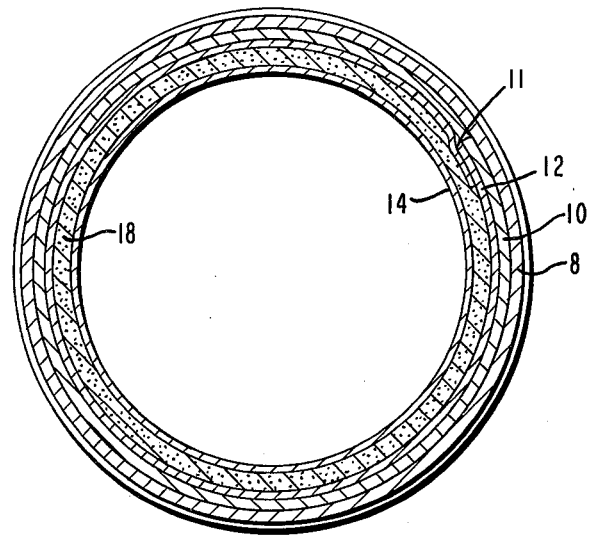
FIG. 3 is a cross-sectional view, reduced in size, along 3—3 of FIG. 2.

A typical cylindrical cell of FIGS. 2 and 3 can be constructed according to the following procedure. Steel can 8 is formed by a deep-drawing operation. An expanded portion near the rim forms shoulder 23 on which polypropylene seal ring 9 will rest. The can also has a location dimple 16, which will serve to center the inner sub-assembly. The interior of can 8 is etched with a mixture of diluted hydrochloric and nitric acids, rinsed thoroughly, and dried to promote bonding thereto of the lithium anode 10. Insulating plastic film 17 (it can be, say, polyethylene) is affixed to the inside bottom of can 8 by melt-coating.

Lithium anode 10 is cut in a rectangular shape from a sheet of the metal. All operations involving lithium metal are carried out under an inert atmosphere. The anode is bonded to the etched inner surface of the can by mild pressure. Said pressure can be supplied by squeezing between thumb and forefinger, or by a suitable tool. The ends of the rolled sheet should butt as tightly as possible near 11.

Separator 12 is cut in a rectangular shape, slightly longer and somewhat wider than anode 10. Separator 12 is placed inside the can next to the lithium cylinder; it extends slightly beyond the lithium near the bottom of the can at 13, and extends considerably more beyond the lithium near the top of the can. At this time, the separator is not yet folded down toward the axis of the cylinder, as shown in FIG. 2 of the finished cell, but remains standing upright where it will serve as a guide during the addition of FeS particles 18. Separator 12 overlaps itself at 11 in FIG. 3. The lower end of separator 12 can be formed around the lower end of anode 10 by use of a special tool consisting of a rolling disc attached co-axially to the end of a long, thin rod.

Steel can 14 is formed by deep-drawing, to be the basis of the inner cell sub-assembly. Insulating and locating disc 15 is formed from polypropylene by injection molding. This disc contains an outer annular recess and a central location dimple. If desired, can 14 can at this point be filled with an inert substance such as sand to minimize overheating and to make the cell more resistant to crushing. The open end of can 14 is pressed to form a friction fit into the outer annular recess in disc 15.

Steel lid 20 is stamped with a protruding positive contact. If desired, insulating adhesive paper or tape 21 may be affixed thereto. Nickel foil contact tab 22 is spot-welded to the inside of lid 20. Injection molded polypropylene seal ring 9 is placed around lid 20, where it stays by friction fit.

The inner sub-assembly is inserted into the outer sub-assembly being careful that the circumference of disc 15 does not scrape against separator 12 hard enough to displace it. Such displacement can be prevented by coiling a thin piece of springy shim stock inside the outer sub-assembly prior to the insertion of the inner sub-assembly, then withdrawing this protective sheath after said insertion. The central dimple in 15 should fit over locating dimple 16.

Commercial FeS is ground in a mill and classified as to particle size with sieves. The 16-325 mesh fraction is soaked in water, filtered, and dried. The resulting FeS powder is placed on the outside of the bottom of can 14 (i.e., now at the top end of the cell) inside the wall formed by the upstanding separator, 12. The FeS particles are induced to fill the annular space between separator 12 and can 14 by tapping and/or vibration. With the annular space filled, the excess FeS is removed from the top of the cell, for example, by suction. The upstanding separator wall is now folded down toward the axis of the cylindrical cell at 19.

Liquid electrolyte is now pipetted into the cell, where it wets and is imbibed by the FeS particles 18 and separator 12. Gas bubbles, if present, are eliminated by vibrating, tapping, or partial evacuation. The exposed center of the bottom of can 14 is wiped dry, and nickel tab 22 spot-welded to it. The upper sub-assembly is pushed firmly onto can shoulder 23. The upper rim of can 8 is crimped inward, sealing the cell tightly by radial compression against the vertical walls of seal ring 9.

Invention cells, into which FeS particles were snugly packed but not pressed in any manner, were subjected to mechanical shock by dropping them from a height of 4 ft onto a hard surface, then allowed to stand 4 days before discharge. The cells had performance fully equal to unshocked cells. Apparently then, there was no migration of fine ferrous sulfide particles through the separator.

When tested under high drain conditions, as for flashlight use, it would be expected that unpressed powder cathodes would give poor performance due to poor conductivity from particle to particle. Surprisingly, it was found that cell performance was often better with unpressed cathodes than with cathodes pressed under upwards of 1000 lbs/in² pressure. Furthermore, these results were achieved with about 25% less FeS, by weight, in the unpressed cells than in the pressed cells. See the Examples and Comparisons which follow.

EXAMPLES 1 TO 5 AND COMPARISONS A TO E

The button cells of Examples 1 to 5 were constructed as described herein and had an active cathode area of 6.87 cm² and an active cathode weight of 1.86 gms. No appreciable pressure was exerted upon the FeS particles when sealing the cells. The cells employed an electrolyte of 20% lithium perchlorate, 22% glyme (the dimethylether of ethylene glycol), 0.5% 3,5-dimethylisoxazole, and 57.5% dioxolane, by weight. The cells were tested by discharging continuously through a set resistance at room temperature until the voltage fell below 0.80 volt. In the Table below, data are presented for discharge through five different resistances, and the data converted to that which would be expected from a 50 cm² "D" cell. The ordinary "D" cell in home flashlight use discharges through about 2 to 4 ohms resistance per cell.

A group of cells were also prepared (Comparisons A to E) using the same materials as those of Examples 1 to 5, but with cathodes pressed at 24,000 lbs/in² pressure and having an active cathode area of 6.72 cm² and an active cathode weight of 2.29 to 2.35 grams. The pressed cathodes incorporated a suitably sized piece of 12 mesh stainless steel screen of 0.010 inch thickness. No other binder or conductivity aid was used. These cells were tested in the same manner as those of the Examples. The results given for the Examples and the Comparisons are the better of a duplicate pair.

It is seen from the Table that the cells employing unpressed cathodes gave significantly more ampere hours of operation than comparable pressed cathodes in 3 out of the 5 comparisons and nearly equivalent performance in the other two comparisons. The art suggests the contrary: that performance would be inferior for cathodes containing unpressed cells, perhaps significantly inferior, in all cases.

In the Table, mA refers to milliamperes and mA-H refers to milliampere hours. The factors used to convert the milliampere hours for the button cells to the corresponding milliampere hours for the "D" cells are: 7.44 for the pressed FeS, and 7.23 for the loose FeS.

TABLE

CELLS EMPLOYING FERROUS SULFIDE CATHODES

| | Cell | Ohms | Hours | Volts | Avg. mA | mA/cm² | mA-H | Ohms | Avg. mA | mA-H |
|---|---|---|---|---|---|---|---|---|---|---|
| | | | Button Cells | | | | | Equivalent 50-cm² "D" Cell | | |
| Example | 1 | 15.0 | 6.8 | 0.98 | 65 | 9.5 | 444 | 2.06 | 470 | 3230 |
| Comparison | A | 15.0 | 6.8 | 0.99 | 66 | 9.8 | 449 | 2.02 | 490 | 3310 |
| Example | 2 | 20.0 | 10.5 | 1.01 | 50 | 7.3 | 530 | 2.75 | 360 | 3860 |
| Comparison | B | 20.0 | 9.3 | 1.01 | 51 | 7.6 | 470 | 2.69 | 380 | 3490 |
| Example | 3 | 30.0 | 17.0 | 1.07 | 36 | 5.2 | 606 | 4.13 | 260 | 4400 |
| Commparison | C | 30.0 | 15.6 | 1.07 | 36 | 5.4 | 556 | 4.03 | 270 | 4140 |
| Example | 4 | 50.0 | 29.0 | 1.13 | 23 | 3.3 | 655 | 6.88 | 170 | 4760 |
| Comparison | D | 50.0 | 25.3 | 1.14 | 23 | 3.4 | 577 | 6.72 | 170 | 4290 |
| Example | 5 | 120.0 | 61.7 | 1.24 | 10.4 | 1.5 | 638 | 16.5 | 75 | 4660 |
| Comparison | E | 120.0 | 62.4 | 1.25 | 10.4 | 1.5 | 651 | 16.1 | 77 | 4840 |

The embodiments of the invention in which an exclusive property or privilege is claimed are defined as follows:

1. In a sealed galvanic cell comprising a container holding a cathode of cathodically active material, an anode, a conductive nonaqueous liquid electrolyte and a separator between the anode and the cathode, the improvement which comprises FeS particles uncompressed except for minor incidental pressure which results from sealing the cell as the cathodically active material, said particles being about 0.04 to 1 mm in diameter.

2. A sealed galvanic cell according to claim 1 wherein the anode is lithium metal and the electrolyte is $LiClO_4$ in 1,3-dioxolane.

3. A sealed galvanic cell according to claim 2 containing 3,5-dimethylisoxazole stabilizer.

* * * * *